July 10, 1945. C. O. BLAISDELL 2,380,212
APPARATUS FOR ARTICLE WORKING
Filed Jan. 12, 1943 3 Sheets-Sheet 2
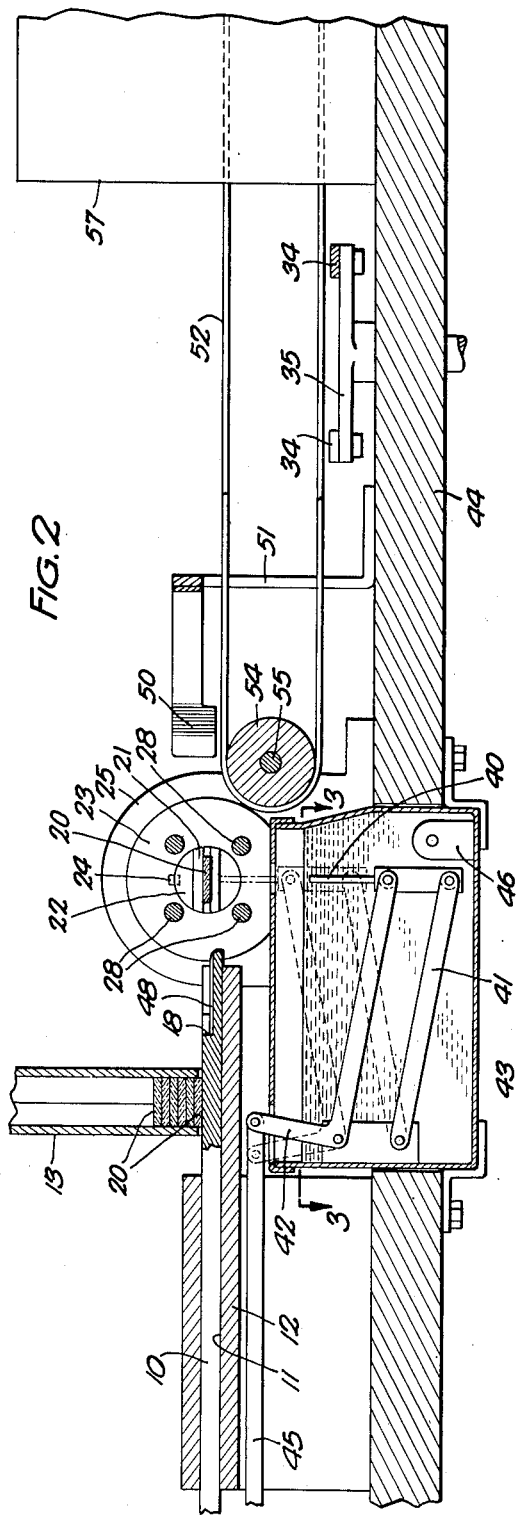
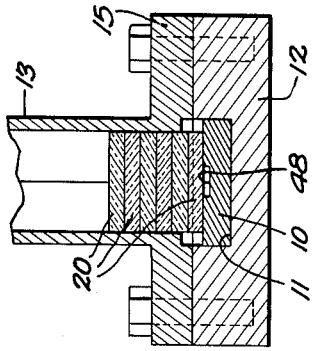
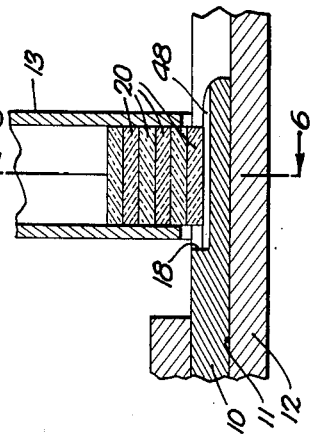
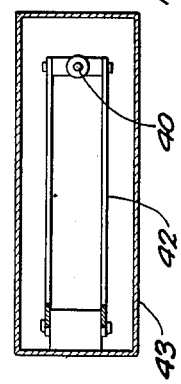
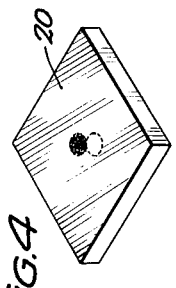
INVENTOR
C. O. BLAISDELL
BY Harry L. Duft
ATTORNEY Patented July 10, 1945

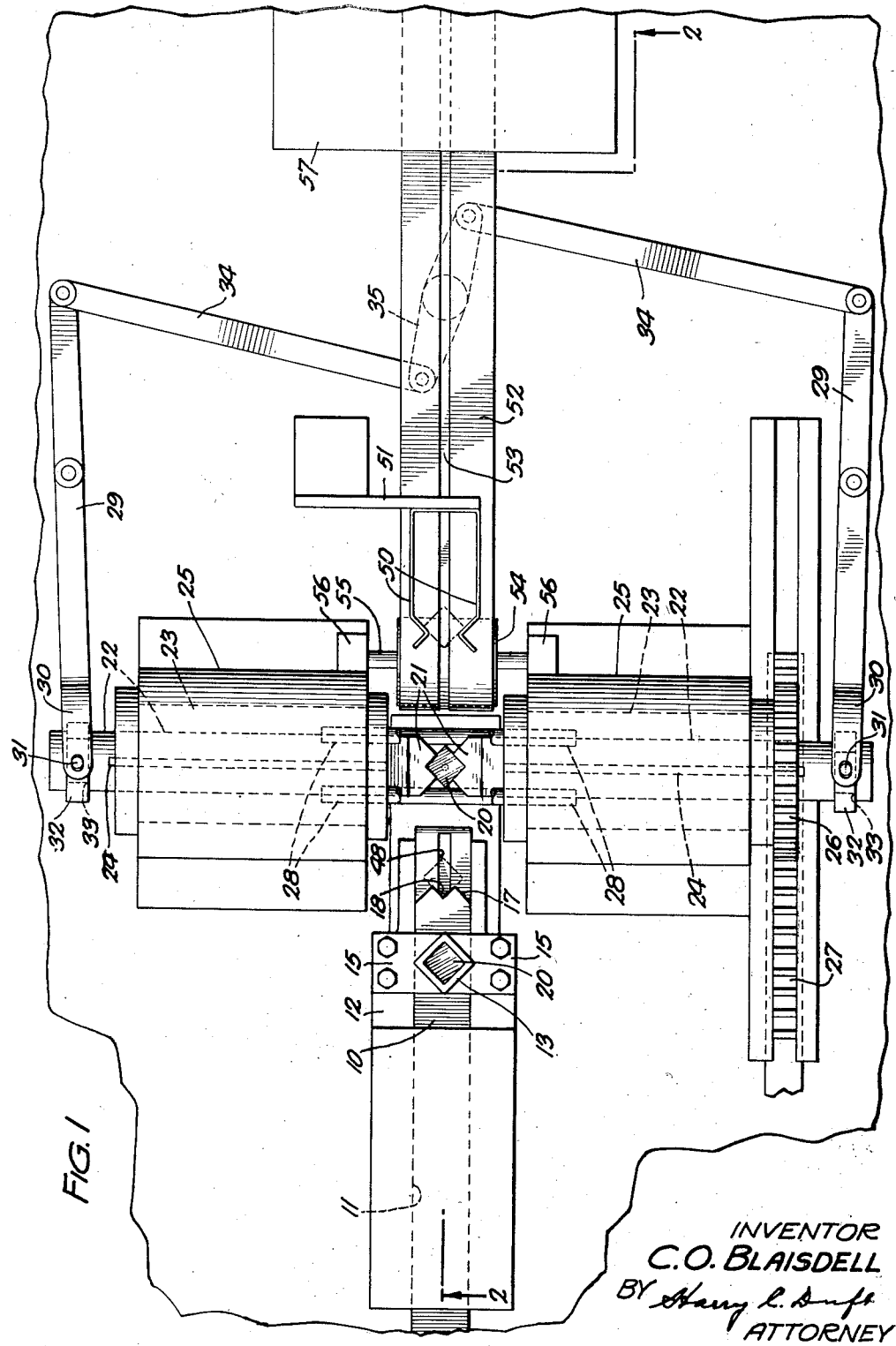

2,380,212

UNITED STATES PATENT OFFICE 2,380,212

APPARATUS FOR ARTICLE WORKING

Charles O. Blaisdell, Oak Park, Ill., assignor to Western Electric Company, Incorporated, New York, N. Y., a corporation of New York Application January 12, 1943, Serial No. 472,174

8 Claims. (Cl. 91—47)

This invention relates to apparatus for article working and more particularly to an apparatus for spotting quartz crystals.

It is sometimes the practice to provide the quartz crystals used as frequency control devices in some types of electric apparatus with a spot of metallic paste such as silver paste prior to soldering in order to provide a suitable surface for the solder to adhere to. The quantity of paste to be used and the centering of the spot must be controlled with great accuracy. Because of the small size and fragility of the crystals sometimes used, some difficulties may be experienced in properly spotting these crystals. Quartz crystals of this type are subject to variations in output and in frequency when exposed to dirt, or when touched by human hands, due to the fact that a certain amount of foreign matter is usually deposited thereby on the crystals.

An object of the present invention is to provide an efficient and effective apparatus for spotting quartz crystals.

In accordance with one embodiment of this invention, an apparatus may be provided for spotting crystals comprising a magazine for the crystals, a reciprocating slide for feeding crystals from the magazine to a pair of clamping jaws which are rotatably mounted to present successively both sides of a crystal to a spotting device, and a stripping device to remove spotted crystals from the slide.

Other objects of the present invention will be more apparent from the following detailed description taken in conjunction with the drawings, wherein:

Fig. 1 is a fragmentary plan view of a crystal spotting apparatus constructed in accordance with this invention;

Fig. 2 is a sectional view along the line 2—2 of Fig. 1;

Fig. 3 is a sectional view along the line 3—3 of Fig. 2 showing only the spotting mechanism;

Fig. 4 is an enlarged perspective view of a crystal spotted in accordance with this invention;

Fig. 5 is a fragmentary, enlarged sectional view of the magazine and slide showing the slide in full retracted position, Fig. 6 is a fragmentary sectional view along the line 6—6 of Fig. 5.

Figure 7:
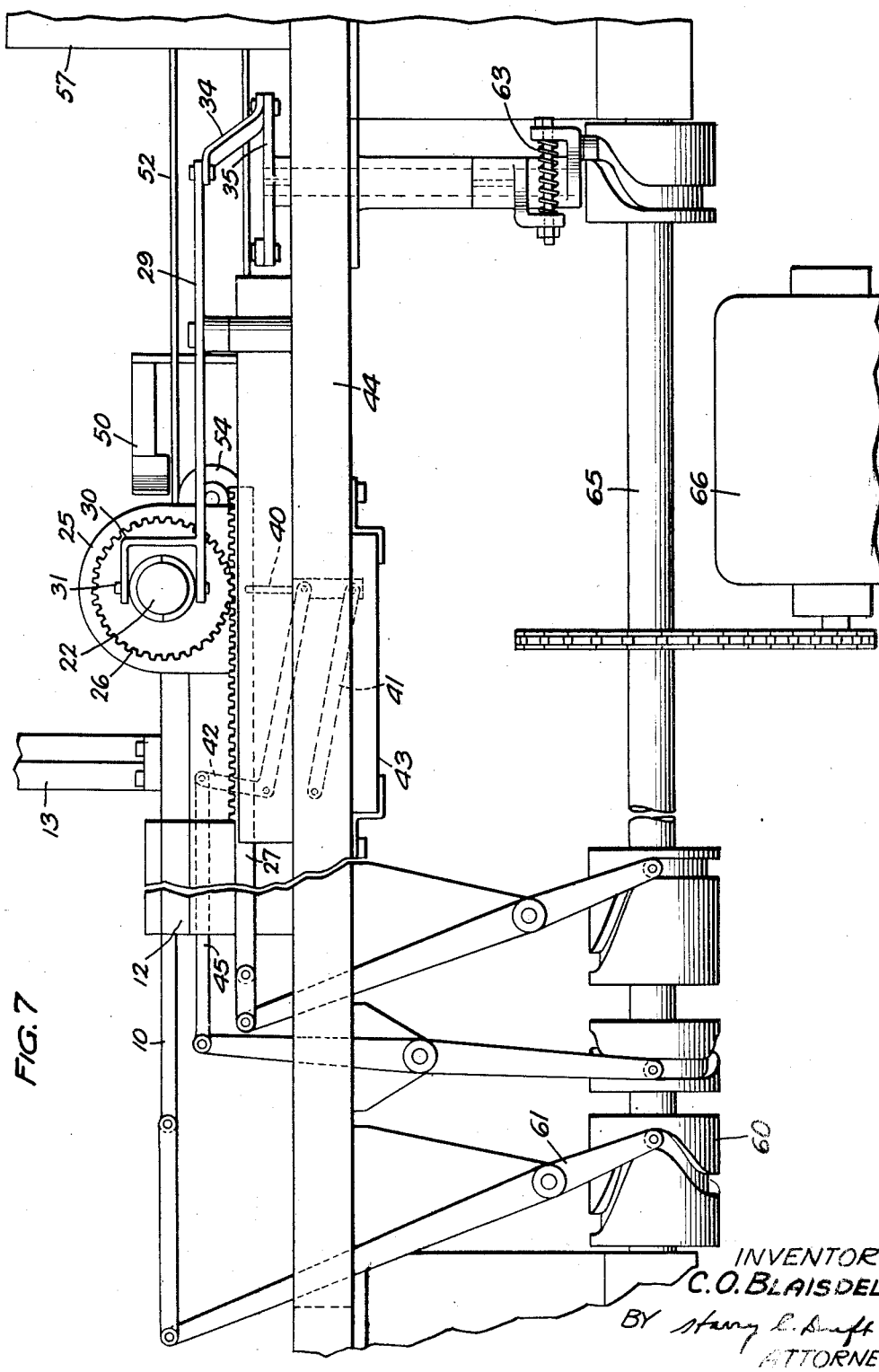
Fig. 7 is a side elevational view of the apparatus showing the drive therefor.

Prior to applying the bonding paste to the crystal, the crystals may be diced into squares of the desired size and etched in a suitable bath. The crystals are then ready to have a small spot of a suitable bonding compound containing conducting material applied to either side to serve as an anchor whereby lead wires may be soldered to either side of the crystal.

Referring now to the drawings and particularly to Figs. 1 and 2, a reciprocable crystal transfer slide 10 is shown slidably positioned in a channel 11 formed in an apparatus housing member 12. A vertically mounted, removable crystal magazine 13 is positioned above the slide 10 so as to supply crystals thereto and is supported on the sides of the member 12 by a flanged portion 15 which may be formed integrally with each magazine so as to position variously sized magazines on the apparatus. The lower portion of the magazine, when the magazine is in position on the housing member 12, extends to a point a short distance above the slide. Ordinarily this distance is approximately half the thickness of a crystal. Thus, as the lowest crystal is removed by the reciprocating slide 10, the crystal above the lowest crystal is prevented from moving forward by the sides of the magazine, and prevented from dropping by the upper surface of the portion of the slide 10 behind the removed crystal. At the same time, because of the separation between the surface of the slide and the lower end of the magazine, interference between the slide and the lower end of the magazine is avoided.

In practice, the crystals to be spotted are loaded in a magazine of suitable size at the completion of the etching operation, a suitable stop member being provided at the base of the magazine to retain crystals therein during the loading operation and the transfer to the spotting apparatus. It will be noted that the magazine 13 is so mounted with relation to the slide that a corner of a crystal, rather than a side, is presented to the center portion of the slide. This centers the crystal with respect to the slide and adapts the apparatus to receive crystals of various dimensions.

In order to feed the crystals from the magazine one at a time, the forward portion of the slide is recessed as shown in Fig. 2, to a depth slightly less than the thickness of a crystal, leaving a shoulder 17. A square cornered notch 18 is formed in the center of the shoulder 17 and is adapted to receive the rearwardly extending corners of the bottom crystal on the magazine. By engaging a corner of the crystal, which is a square, with the square notched recess 18, the crystal will be accurately centered on the slide.

The sides of the shoulder 17 of the slide adjacent the notch 18 extend rearwardly forming an angle of approximately 90 degrees with the sides of the notch. This construction facilitates operation of the mechanism for stripping crystals from the slide at the completion of the spotting operation, as will be explained hereinafter. Means for reciprocating the slide are shown in Fig. 7 and comprise a cam 60 and lever mechanism 61 operating in synchronism with the other parts of the apparatus, as will be explained. Such operation synchronizing devices are well known and form no part of the present invention.

After a crystal 20 has been positioned on the slide, the slide is moved forward to carry the crystal between a pair of clamping jaws 21. These jaws may be formed integrally with the ends of a pair of shafts 22 which are reciprocably journalled into rotatably mounted cylindrical members 23. As shown in Figs. 1 and 2, these shafts 22 are provided with keying members 24 in order to key them to the rotatable members 23, while at the same time permitting the shafts 22 to slide axially with respect to these members 23 to bring the clamping jaws 21 together.

The cylindrical members 23 are rotatably mounted in a suitably formed housing 25. A large pinion gear 26 is keyed to the end of one of these members and a rack 27 is associated therewith to facilitate rotation of the jaws through 180 degrees to present both sides of a crystal supported therebetween to a spotting device shown in Figs. 2, 3 and 7. A number of rods 28 fixed in both rotatable cylinders 23 and extending therebetween, lock the cylinders together and consequently maintain a fixed angular relation between the clamping jaws 21. The alignment of the jaws 21 must, of course, be maintained within very close limits since it is highly desirable that the crystals be spotted at the precise center thereof in order to obtain maximum operating efficiency.

The jaws 21 are moved together and apart by a pair of arms 29 which are operably attached to the outer ends of the shafts 22 through yokes 30 which may be formed integrally with the arms 29 and which engage pins 31 attached to split collars 32 which in turn are each positioned in an annular groove 33 formed at the outer end of each shaft 22, as shown in Fig. 1. A pair of links 34 are pivotally attached to the free ends of the arms 29 and are in turn connected to a double crank 35 positioned approximately midway between the arms 29. The arms 29 are pivotally supported at a point between the shafts 22 and the links 34. One of the links 34 is attached to one side of the double crank 35 while the other link is attached to the other side. Thus, rotating the double crank 35 will either cause the links 34 to spread the arms 29 apart or to pull them closer together and, consequently, correspondingly to move the jaws 21.

Since this apparatus is intended to accommodate crystals of various sizes, the double crank 35 is not directly connected to its driving means but rather a resilient driving connection 63 may be employed so that if a large crystal is positioned between the jaws, it will not be crushed, while on the other hand, if a small crystal is positioned therebetween, it will be firmly engaged and supported. The double crank 35 may be operated in timed relation to the operation of the slide 10.

When the jaws 21 have engaged a crystal, positioned therebetween by the slide 10, the slide is withdrawn and the spotting device, comprising a vertically positioned spotting rod 40, mounted between two pairs of pivotally supported bracket arms 41 and 42, is then actuated to apply a spot of silver compound, or other similar metallic bonding material, to the underside of the crystal. The rod 40 is submerged beneath the surface of the compound, which is contained in a tank 43 mounted on a table 44 which supports this apparatus. When the upper pair of bracket arms 42, which are L-shaped, as shown in Fig. 2, are pivoted counter-clockwise, a rearwardly extending actuating rod 45 being pivotally attached to the L-shaped upper portion thereof, the rod 40 is raised above the surface of the paste and into contact with the underside of the crystal, depositing thereon an amount of bonding material determined by the shape of the contacting surface of the rod and the viscosity of the paste. By submerging the spotting apparatus in the compound, the spotting compound is constantly agitated and settling of the suspended materials largely avoided. However, if more agitation is required, a small agitator 46, such as a solenoid operated paddle, might be provided.

When one side of the crystal has been provided with a spot of bonding material, the clamping jaws are rotated through 180 degrees by actuating the rack 27, and the other side of the crystal is presented to the spotting device. The spotting device is then again actuated to apply a spot of paste to the crystal. After both sides of the crystal have been spotted, the slide 10 is again moved forward to engage the crystal, the clamping jaws 21 being opened to release the spotted crystal as it is engaged by the slide. It will be noted that a groove 48 is formed in the forward portion of the slide 10 and extends from the forward edge of the slide to the shoulder 17. Thus, when a spotted crystal is engaged by the slide, no portion of the slide touches the spot.

The slide continues to move forward to carry the crystal into engagement with a stripping device comprising a pair of spring arms 50 mounted on a bracket 51 and positioned above a conveyor belt 52. The bracket 51 is fixed to the table 44. As will be seen in Fig. 1, the forward portions of the spring arms 50 are bent sharply inwardly and then outwardly at an angle of approximatey 90 degrees to the inwardly bent portion. Thus, as a crystal reaches the forward portion of the spring arms, the springs will be spread apart slightly by the forward movement of the corner of the crystal which acts as a wedge and then, as the crystal is moved the inwardly bent portion, the spring arms will again move together and will engage the rear edges of the crystal. The portions of the shoulder 17 adjacent the notch 18 in the slide 10, as aforementioned, extend rearwardly at approximately right anges to the sides of the notch 18, thus avoiding interference with the ends of the springs 50.

After the spring arms 50 have engaged the rear edges of a crystal, the slide 10 is withdrawn and the retained crystal drops onto a conveyor belt 52 of suitable heat resistant material. A groove 53 is formed in the center of the belt to avoid contact of the belt with the spot on the lower side of the crystal, which may still be slightly wet. The belt passes around an idler drum 54 mounted on a shaft 55 journalled into a bearing block 56, which is in turn mounted on the table 44, a driving drum (not shown) being positioned at the delivery end of an oven

57, shown fragmentarily, through which the belt passes. The conveyor carries the spotted crystal through the oven 57 where the spots are baked to the desired degree.

A better understanding of the apparatus may be had by reference to the following description of one complete cycle of operation. It will be understood that the apparatus may be operated by driving mechanism, shown in Fig. 7, for properly synchronizing the various parts of the apparatus or that it may be manually operated, the various operations being performed in proper sequence by the operator. The drive as shown in Fig. 7 includes a cam shaft 65 connected to a motor 66.

The slide 10 is moved to the position shown in Fig. 5 to receive the lowermost crystal 20, then moved forward to position the crystal between the clamping jaws 21. The clamping jaws are moved together to engage and support the crystal and the slide 10 is withdrawn a short distance. The spotting rod 40 is moved into engagement with the lower side of the crystal to deposit a spot of bonding material thereon by moving the rod 45 to the left, as shown in Fig. 2. The rod 45 is then moved to the right to the right to move the spotting rod out of engagement with the crystal and return it to the tank 43. The clamping jaws 21 are rotated through 180° by actuating the rack 27 so as to present the other side of the crystal to the spotting rod 40. The spotting rod is again actuated to apply a spot of bonding material to the other side of the crystal, after which the slide 10 is moved forward to engage the crystal. The jaws 21 are moved apart to release the crystal, which then rests on the slide 10. The slide 10 is moved forward to carry the spotted crystal into engagement with the stripping device 50 and then moved back to the starting position to receive another crystal. This return movement of the slide causes the spotted crystal to be removed therefrom and deposited on the conveyor which carries the crystal into the oven 57.

While but one embodiment of this invention has been shown and described, it will be understood that many changes and modifications may be made therein without departing from the spirit and scope of the present invention.

What is claimed is:

1. In an apparatus for spotting quartz crystals, a magazine for holding a supply of crystals, clamping jaws for supporting a crystal in a position to receive a spot of material on one of its sides, a reciprocable slide for sequentially feeding a crystal from said magazine to said clamping jaws and for feeding a spotted crystal from said jaws, the forward portion of said slide being recessed to receive a crystal and to form a shoulder for carrying said crystal forward, means for applying material to said crystal while it is supported by the clamping jaws, means for rotating said jaws to present successively both sides of the crystal to said material applying means, and a stripping means comprising a pair of spring arms adapted to receive and engage a spotted crystal.

2. In an apparatus for spotting quartz crystals, a magazine for holding a supply of crystals, clamping jaws for supporting a crystal in a predetermined position, a reciprocable slide associated with said magazine for feeding a crystal to said clamping jaws, the forward portion of said slide being recessed to receive a crystal and to form a shoulder for carrying said crystal forward, said shoulder being notched to engage a corner of said crystal to center said crystal with respect to the slide, and a groove in said recessed portion to avoid contact of the slide with the center portion of a crystal.

3. In an apparatus for spotting quartz crystals, clamping jaws for supporting a crystal in position to receive a spot of material on one of its sides, means for sequentially feeding a crystal to said jaws and for feeding a spotted crystal from said jaws, means for applying spotting material to a crystal while it is supported by said clamping jaws, means for rotating said jaws to present successively both sides of the crystal to said material applying means, a conveyor having a groove extending along the center portion of said conveyor to avoid contact of the conveyor with the spotting material on a crystal, and means for stripping a spotted crystal from said feeding means and for depositing it on said conveyor.

4. In an apparatus for spotting quartz crystals, a magazine for holding a supply of crystals, clamping jaws for supporting a crystal in position to receive a spot of material on one of its sides, a reciprocable slide associated with said magazine for sequentially feeding a crystal to said clamping jaws and for feeding a spotted crystal from said jaws, the forward portion of said slide being recessed to receive a crystal and to form a shoulder for carrying said crystal forward, said shoulder being notched to engage a corner of said crystal to center said crystal with respect to said slide, said recessed portion being slotted to avoid contact with the center portion of a crystal, a spotting device comprising a tank for containing spotting material, a spotting rod in said tank, pivotally mounted bracket arms for supporting said rod in said tank and for moving it into contact with a crystal while the crystal is supported by said clamping jaws, means for rotating said jaws to present successively both sides of the crystal to said spotting device, a belt conveyor having a groove extending along the center portion of said conveyor to avoid contact of the conveyor with the spotting material on a crystal, and a stripping mechanism comprising a pair of spaced spring arms having their forward portions bent inwardly and then outwardly to receive and engage a crystal from the reciprocable slide and to deposit it on said conveyor.

5. In an apparatus for spotting quartz crystals, means for supporting a crystal in position to receive a spot of material on one of its sides, means for feeding a crystal to said supporting means, reciprocating means for applying a quantity of material to a predetermined point on one side of a crystal while it is supported by said supporting means, and means for rotating said supporting means to present successively both sides of the crystal to said applying means.

6. In an apparatus for spotting quartz crystals, a magazine for holding a supply of crystals, clamping jaws for supporting a crystal in position to receive a spot of material on one of its sides, means for moving a crystal from the magazine into engagement with said jaws, means for actuating the jaws to clamp the crystal, means actuated at a predetermined time for applying a spot of material to said crystal, and means for rotating said jaws to present successively both sides of the crystal to said material applying means.

7. In an apparatus for spotting quartz crystals, a magazine holding a supply of the crystals, clamping jaws for supporting a crystal in one position to receive a spot of material on one of its sides, means for sequentially feeding a crystal from said magazine to said jaw and for feeding a spotted crystal from said jaws, means actuated for applying a spot of material to said crystal after it is positioned by the jaws, means for rotating said jaws to present successively both sides of the crystal to said material applying means, and means for stripping a spotted crystal from said feeding means.

8. In an apparatus for spotting quartz crystals, a magazine for holding a supply of crystals, clamping jaws for supporting a crystal in position to receive a spot of material on one of its sides, a reciprocable slide beneath said magazine for feeding a crystal to said clamping jaws, the forward portion of said slide being recessed to receive a crystal and to form a shoulder for carrying said crystal forward, means for actuating the jaws to clamp the crystal in a predetermined position, means for applying material to said crystal while it is supported by said clamping jaws, and means for rotating said jaws to present successively both sides of the crystal to said material applying means.

CHARLES O. BLAISDELL.

CERTIFICATE OF CORRECTION.

Patent No. 2,380,212.  July 10, 1945.

CHARLES O. BLAISDELL.

It is hereby certified that error appears in the printed specification of the above numbered patent requiring correction as follows: Page 2, second column, line 56, after "moved" insert --beyond--; and that the said Letters Patent should be read with this correction therein that the same may conform to the record of the case in the Patent Office.

Signed and sealed this 25th day of December, A. D. 1945.

Leslie Frazer (Seal)  First Assistant Commissioner of Patents.